(12) United States Patent
Fang

(10) Patent No.: US 7,364,345 B2
(45) Date of Patent: Apr. 29, 2008

(54) BACKLIGHT MODULE HAVING FRAME WITH SPRING MEMBERS

(75) Inventor: Chien-Chung Fang, Miao-Li (TW)

(73) Assignee: Innolux Display Corp., Miao-Li County (TW)

( * ) Notice: Subject to any disclaimer, the term of this patent is extended or adjusted under 35 U.S.C. 154(b) by 0 days.

(21) Appl. No.: 11/491,708

(22) Filed: Jul. 24, 2006

(65) Prior Publication Data

US 2007/0019440 A1 Jan. 25, 2007

(30) Foreign Application Priority Data

Jul. 22, 2005 (TW) .................... 94124878

(51) Int. Cl.
*F21S 4/00* (2006.01)
(52) U.S. Cl. .................. 362/634; 362/288; 362/369; 362/632

(58) Field of Classification Search ............ 349/58–65; 362/632–634, 288, 369, 390, 457, 458
See application file for complete search history.

(56) References Cited

U.S. PATENT DOCUMENTS

| 6,806,921 B2 * | 10/2004 | Nishida et al. ............... 349/58 |
| 6,961,103 B2 | 11/2005 | Sung et al. |
| 7,195,392 B2 * | 3/2007 | Shiau ........................ 362/633 |
| 2006/0098134 A1 * | 5/2006 | Park et al. .................... 349/58 |

* cited by examiner

*Primary Examiner*—Anabel M Ton
(74) *Attorney, Agent, or Firm*—Wei Te Chung

(57) ABSTRACT

An exemplary backlight module (1) includes a light guide plate (14), an optical sheet assembly (12), and a frame (10). The frame accommodates the light guide plate and the optical sheet assembly. The light guide plate includes a light emitting surface (144). The optical sheet assembly is disposed on the light emitting surface of the light guide plate. The frame includes a plurality of spring members (105) elastically pressing at least one edge portion of the optical sheet assembly toward the light emitting surface of the light guide plate.

17 Claims, 4 Drawing Sheets

BACKLIGHT MODULE HAVING FRAME WITH SPRING MEMBERS

FIELD OF THE INVENTION

The present invention relates to backlight modules such as those used in liquid crystal displays (LCDs), and more particularly to a backlight module that includes a frame with spring members in order to provide stability.

GENERAL BACKGROUND

Liquid crystal displays are commonly used as display devices for compact electronic apparatuses, because they not only provide good quality images with little power but are also very thin. The liquid crystal molecules in a liquid crystal display do not emit any light themselves. The liquid crystal molecules have to be lit by a light source so as to clearly and sharply display text and images. Thus, a backlight module is generally needed for a liquid crystal display.

Referring to FIG. 6, a typical backlight module 6 includes a frame 60, a light guide plate 61, a light source 62, a reflective sheet 63, and an optical sheet assembly 64. The light guide plate 61 includes a light incident surface 610, a top surface 612 perpendicularly adjoining the light incident surface 610, and a bottom surface 614 opposite to the top surface 612. The light source 62 is disposed adjacent to the light incident surface 610. The reflective sheet 63 is disposed on the bottom surface 614. The optical sheet assembly 64 is disposed on the top surface 612. The frame 60 accommodates the light guide plate 61, the light source 62, the reflective sheet 63, and the optical sheet assembly 64.

The frame 60 includes a spacing board 602 extending from an inner wall (not labeled) thereof. The spacing board 602 has a generally T-shaped cross-section, and is for keeping the optical sheet assembly 64 in position relative to the top surface 612 of the light guide plate 61. Under normal conditions, a gap exists between the optical sheet assembly 64 and a portion of the spacing board 602 above the optical sheet assembly 64. The gap provides room for the optical sheet assembly 64 to expand during stability tests performed on the backlight module 6 or under high temperature conditions. However, because of the gap, the optical sheet assembly 64 is liable to slide or shift relative to the top surface 612. When this happens, the optical performance of the backlight module 6 may be degraded. Moreover, when the optical sheet assembly 64 is expanded, this may result in a so-called waving mura phenomena. When this happens, the optical performance of the backlight module 6 may be degraded.

What is needed, therefore, is a backlight module that can overcome the above-described deficiencies.

SUMMARY

In a preferred embodiment, a backlight module includes a light guide plate, an optical sheet assembly, and a frame. The frame accommodates the light guide plate and the optical sheet assembly. The light guide plate includes a light emitting surface. The optical sheet assembly is disposed on the light emitting surface of the light guide plate. The frame includes a plurality of spring members elastically pressing at least one edge portion of the optical sheet assembly toward the light emitting surface of the light guide plate.

Other advantages and novel features will become more apparent from the following detailed description when taken in conjunction with the accompanying drawings. In the drawings, all the views are schematic.

DETAILED DESCRIPTION OF PREFERRED EMBODIMENTS

Reference will now be made to the drawings to describe the preferred embodiments in detail.

Figure 1:
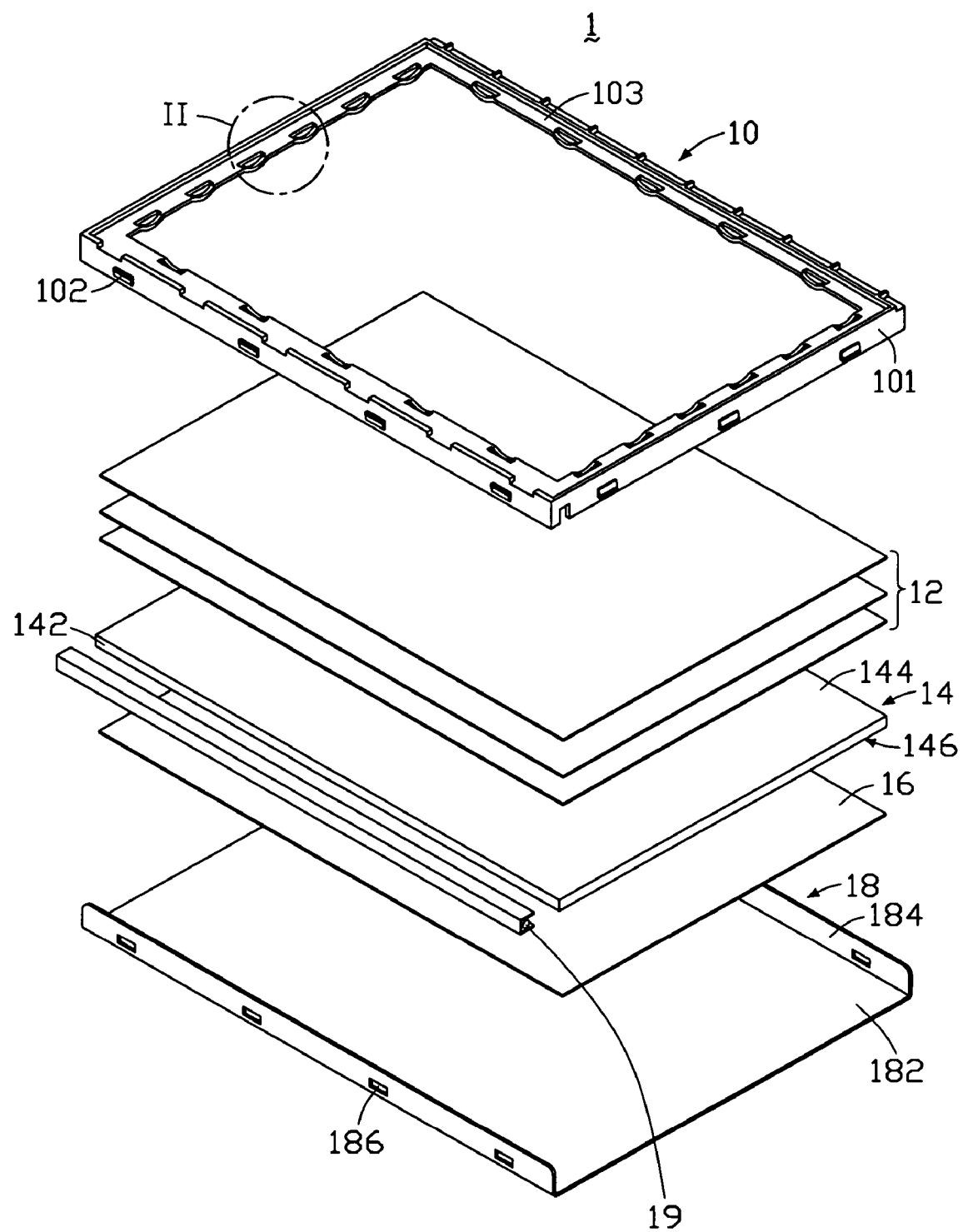
FIG. 1 is an exploded, isometric view of a backlight module according to a first embodiment of the present invention, the backlight module including a frame.

Referring to FIG. 1, a backlight module 1 according to a first embodiment of the present invention includes a frame 10, an optical sheet assembly 12, a light guide plate 14, a reflective sheet 16, and a bottom tray 18, generally disposed in that order from top to bottom. The backlight module 1 further includes a light source 19 disposed adjacent to a light incident surface 142 of the light guide plate 14.

The light guide plate 14 includes the light incident surface 142, a light emitting surface 144 perpendicularly adjoining the light incident surface 142, and a bottom surface 146 opposite to the light emitting surface 144. The optical sheet assembly 12 is disposed on the light emitting surface 144 of the light guide plate 14. The reflective sheet 16 is disposed adjacent to the bottom surface 146 of the light guide plate 14. The light source 19 is a linear illuminator, and in the illustrated embodiment is a cold cathode fluorescent lamp (CCFL). In the illustrated embodiment, the optical sheet assembly 12 includes three optical sheets stacked one on the other. The three optical sheets may for example be a diffusing sheet and two brightness enhancement sheets. The light guide plate 14 can be made from polycarbonate (PC) or polymethyl methacrylate (PMMA).

Figure 2:
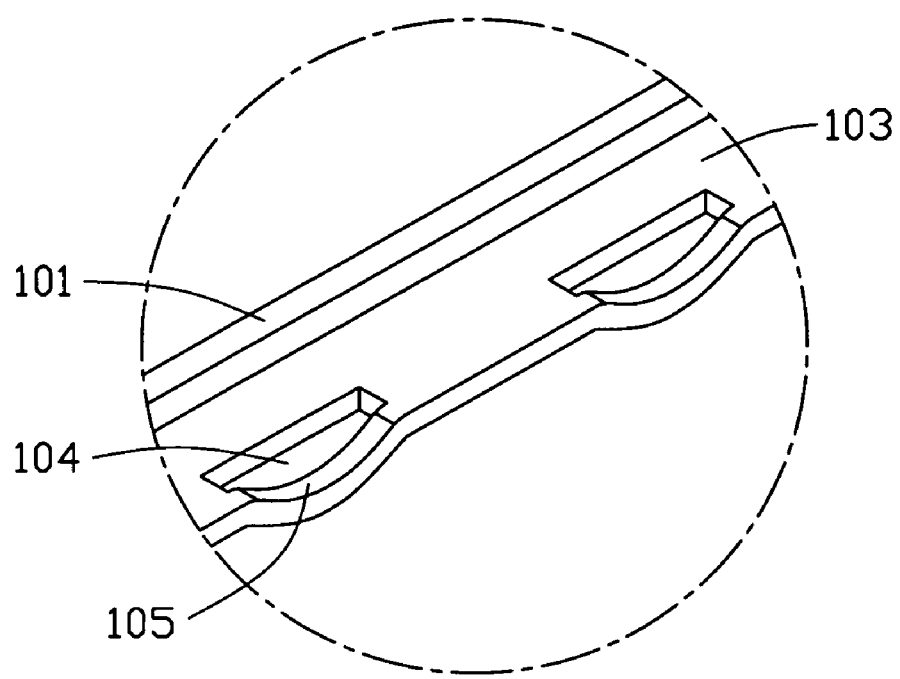
FIG. 2 is an enlarged view of a circled portion II of FIG. 1.

The frame 10 includes four first side walls 101 consecutively adjoining each other end to end. Each first side wall 101 includes a plurality of protrusions 102 integrally extending perpendicularly outwardly from an outer surface (not labeled) thereof. A frame-shaped spacing board 103 integrally extends perpendicularly inward from inner surfaces (not labeled) of the first side walls 101. Referring also to FIG. 2, a plurality of elongate spring members 105 extend down from the spacing board 103. Each spring member 105 is arcuate, with two opposite ends (not labeled) thereof integrally connecting with the spacing board 103. An elongate, substantially rectangular opening 104 is defined in the spacing board 103 adjacent to an outmost side of each spring member 105. That is, each opening 104 is between one respective spring member 105 and one respective first side wall 101. A length of each spring member 105 is approximately the same as that of each opening 104. The frame 10, in general, is made from plastic or any other suitable polymer.

The bottom tray 18 includes a bottom wall 182 and two opposite second side walls 184. The bottom wall 182 is substantially planar. The second side walls 184 extend perpendicularly up from two opposite sides of the bottom wall 182. Each second side wall 184 defines a plurality of notches 186, corresponding to the protrusions 102 of two respective first side walls 101 of the frame 10. The bottom tray 18 is made from iron, aluminum, magnesium, or another suitable metal or alloy.

Figure 3:
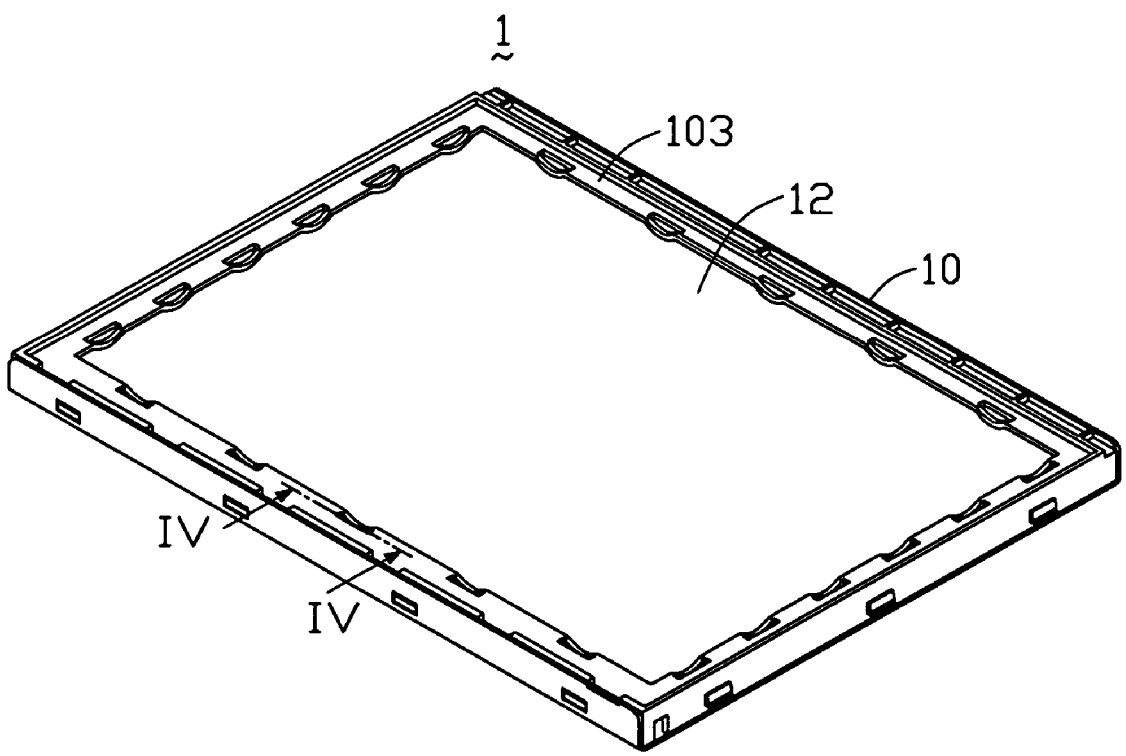
FIG. 3 is an assembled view of the backlight module of FIG. 1.
Figure 4:
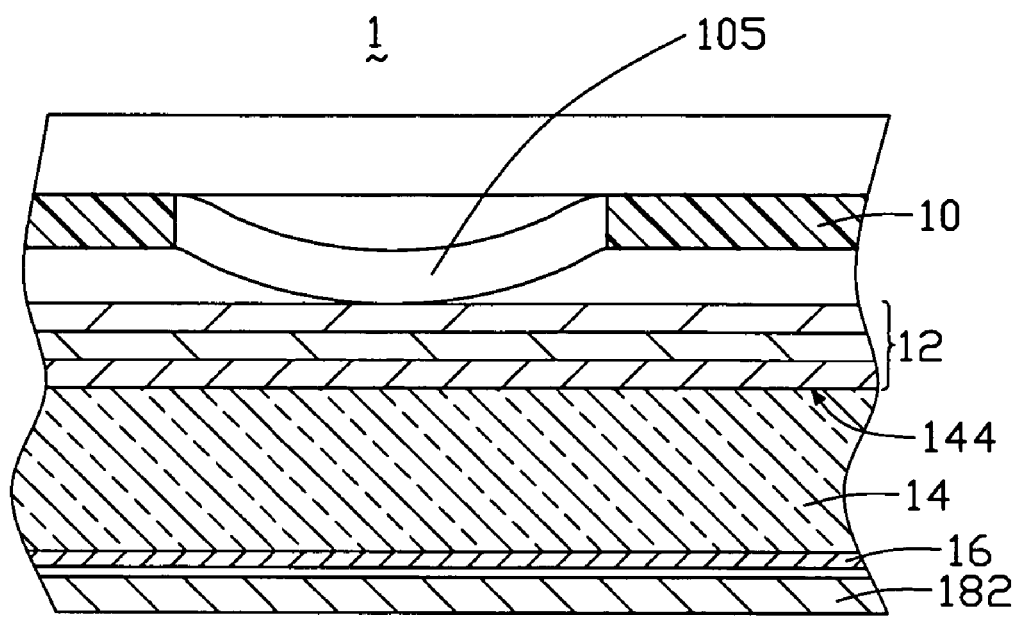
FIG. 4 is an enlarged, cross-sectional view taken along line IV-IV of FIG. 3.

Referring also to FIG. 3 and FIG. 4, these show the backlight module 1 as assembled. The frame 10 and the bottom tray 18 cooperatively define a space for accommodating the optical sheet assembly 12, the light guide plate 14, the reflective sheet 16, and the light source 19. Prior to complete assembly, a first distance between a bottom of each spring member 105 and the spacing board 103 is greater than a second distance between the optical sheet assembly 12 and the spacing board 103. In assembly, the protrusions 102 of said two first side walls 101 of the frame 10 are engagingly received in the notches 186 of the bottom tray 18. Thereby, the frame 10 and the bottom tray 18 are locked together, with the bottoms of the spring members 105 resiliently pressing on the optical sheet assembly 12. That is, because the first distance is greater than the second distance, each spring member 105 is elastically deformed and resiliently presses a respective edge portion of the optical sheet assembly 12 toward the light emitting surface 144 of the light guide plate 14. Thereby, the optical sheet assembly 12 is prevented from sliding or shifting. Moreover, when the backlight module 1 is operating and the optical sheet assembly 12 heats up, the spring members 105 can keep the edge portions of the optical sheet assembly 12 fixed in place. Thereby, expansion of the optical sheet assembly 12 can be prevented. Thus, a waving mura phenomena of the optical sheet assembly 12 can be avoided. Overall, the above-described configuration can help the backlight module 1 achieve good optical performance under a variety of conditions.

Figure 5:
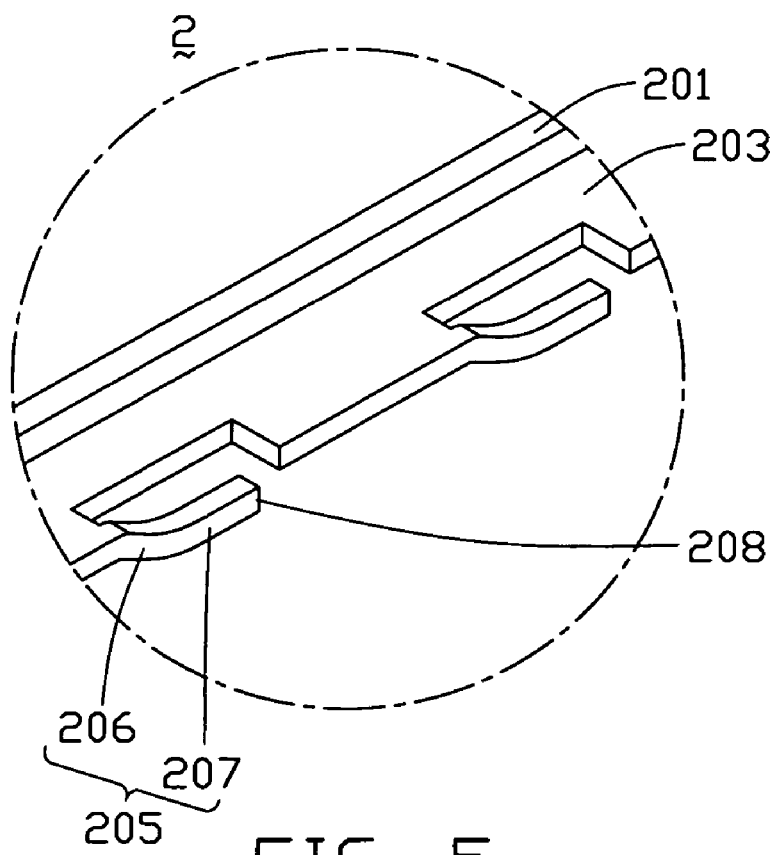
FIG. 5 is similar to FIG. 2, but showing a corresponding view in the case of a backlight module according to a second embodiment of the present invention.
Figure 6:
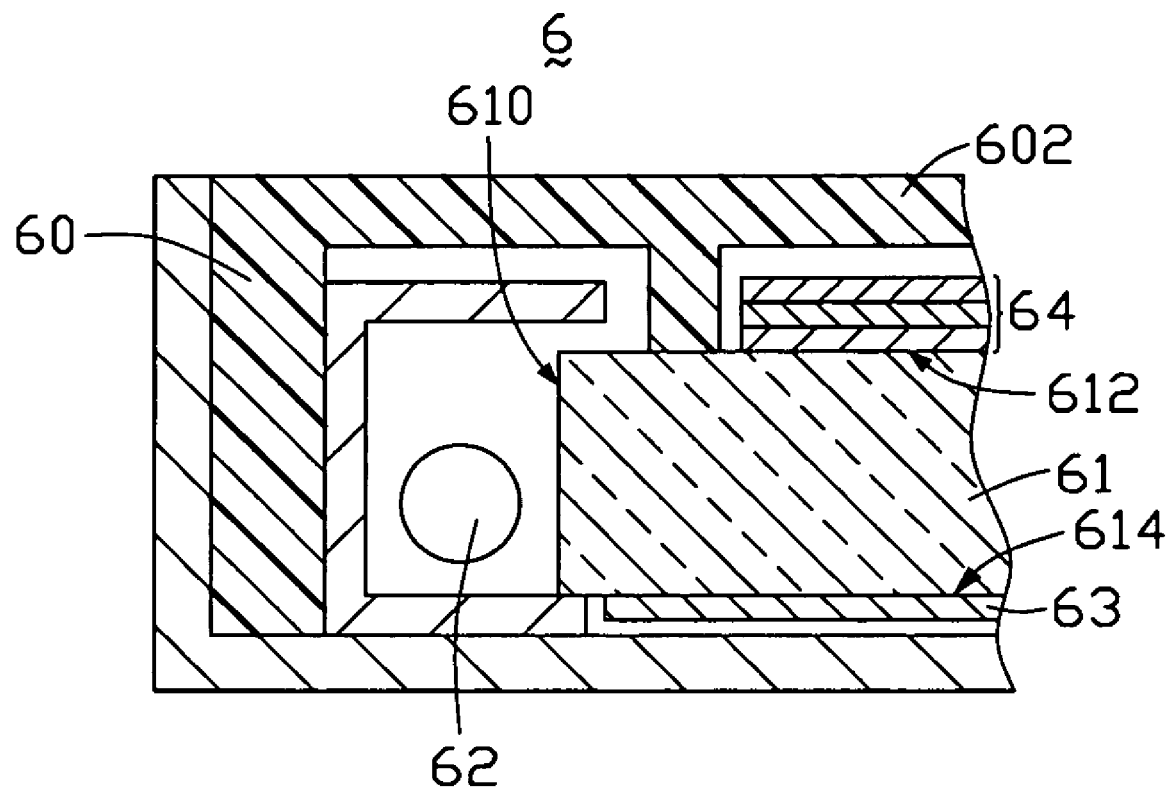
FIG. 6 is a cross-sectional view of part of a conventional backlight module.

Referring to FIG. 5, a backlight module 2 according to a second embodiment of the present invention is similar to the backlight module 1 of the first embodiment. However, in the backlight module 2, a frame (not labeled) includes four first side walls 201 and a spacing board 203. Each of spring members 205 includes a base portion 206 and a spring contact portion 207. The base portion 206 is curved, and integrally connects with the spacing board 203. The spring contact portion 207 integrally extends from the base portion 206, and is generally parallel to the spacing board 203. The spring contact portion 207 has a free end 208. The free ends 208 of all of the spring members 205 that are arranged parallel to any one same first side wall 201 point in a same direction. The backlight module 2 has advantages similar to those described above in relation to the backlight module 1.

Further and/or alternative embodiments may include the following. The light sources can be one or more point light sources, such as light emitting diodes (LEDs) arranged in a line. The light incident surface can be the bottom surface opposite to the light emitting surface. In such case, the light source is disposed adjacent to the bottom surface.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A backlight module comprising:
    a light guide plate comprising a light emitting surface;
    an optical sheet assembly disposed on the light emitting surface of the light guide plate; and
    a frame accommodating the light guide plate and the optical sheet assembly, the frame comprising;
    a plurality of side walls consecutively adjoining other end to end:
    a spacing board integrally extending inward from inner surfaces of the side walls; and
    a plurality of spring members elastically pressing at least one edge portion of the optical sheet assembly toward the light emitting surface of the light guide plate.

2. The backlight module in claim 1, wherein the spacing board is perpendicular to the side walls.

3. The backlight module in claim 1, wherein the spring members are arcuate.

4. The backlight module in claim 3, wherein two opposite ends of each spring member integrally connect with the spacing board.

5. The backlight module in claim 4, wherein the spacing board defines a plurality of elongate openings, and each elongate opening is adjacent to a side of a respective spring member that is nearest a respective side wall.

6. The backlight module in claim 5, wherein a length of each spring member is approximately the same as that of each opening.

7. The backlight module in claim 5, wherein the elongate openings are each substantially rectangular.

8. The backlight module in claim 1, wherein each spring member comprises a base portion integrally connecting with the spacing board.

9. The backlight module in claim 8, wherein the base portion is curved.

10. The backlight module in claim 8, wherein each spring member further comprises a spring contact portion integrally extending from the base portion.

11. The backlight module in claim 10, wherein the spring contact portion is substantially parallel to the spacing board.

12. The backlight module in claim 10, wherein the spring contact portion comprises a free end.

13. The backlight module in claim 12, wherein the free ends of all of the spring members that are arranged parallel to any one same side wall point in a same direction.

14. A backlight module comprising:
    a light guide plate comprising a light emitting surface;
    an optical sheet assembly disposed on the light emitting surface of the light guide plate; and
    a frame accommodating the light guide plate and the optical sheet assembly, the frame comprising:
    a plurality of side walls consecutively adjoining each other end to end: and
    a spacing board intergrally extending inward from inner surfaces of the side walls:
    a plurality of spring members unitarily extending from the frame and elastically pressing at least one edge portion of the optical sheet assembly toward the light emitting surface of the light guide plate.

15. The backlight module as claimed in claim 14, wherein the springs extend from a plane parallel to but spaced from the emitting surface.

16. A backlight module comprising:
    a light guide plate comprising a light emitting surface;
    an optical sheet assembly disposed on the light emitting surface of the light guide plate; and a frame accommodating the light guide plate and the optical sheet assembly, the frame comprising:
a plurality of side wails consecutively adjoining each other end to end: and
a spacing board integrally extend inward from inner surfaces of the side walls:
a plurality of spring members integrally extending from the frame and elastically pressing at least one edge portion of the optical sheet assembly toward the light emitting surface of the light guide plate.

17. The backlight module as claimed in claim 16, wherein the springs extend from a plane parallel to but spaced from the emitting surface.

* * * * *